United States Patent

[11] 3,577,594

| [72] | Inventor | John D. Al-Roy<br>Union City, N.J. |
|---|---|---|
| [21] | Appl. No. | 787,840 |
| [22] | Filed | Dec. 30, 1968 |
| [45] | Patented | May 4, 1971 |
| [73] | Assignee | Monsanto Company<br>St. Louis, Mo. |

[54] APPARATUS FOR FORMING HOLLOW ARTICLES
8 Claims, 4 Drawing Figs.

[52] U.S. Cl. .................................................. 18/19,
100/98
[51] Int. Cl. .................................................. B29c 17/04,
B29c 3/02, B29c 1/16
[50] Field of Search .......................................... 18/5.3
(M,P,F,H), 5.6, 16 (M), 16 (T), 19 (F,M,P), 23,
34 (M), 35, 30 (LA), 30 (LC), 30 (MC), 30
(WC), 30 (WV), 30 (Y), 42 (M), 43, (Laminated
Mold Vacuum Digest Venting); 249/87, 88;
100/46, 258, 98

[56] References Cited
UNITED STATES PATENTS

| 1,626,051 | 4/1927 | Rode | 100/258 |
|---|---|---|---|
| 2,636,433 | 4/1953 | Wennberg | 100/46X |
| 2,814,077 | 11/1957 | Moncrieff | 18/35X |
| 2,998,622 | 9/1961 | Renoux | 18/5.3(F) |
| 3,113,345 | 12/1963 | Butzko | 18/19(F) |
| 3,186,029 | 6/1965 | Joseph | 18/5.3(F) |
| 3,317,960 | 5/1967 | Kramer | 18/19(F) |
| 3,386,324 | 6/1968 | Ihle | 100/258X |
| 3,406,428 | 10/1968 | Brown | 18/35X |
| 3,484,510 | 12/1969 | Corazza | 18/35X |
| 3,479,696 | 11/1969 | Balhouse | 249/88X |

Primary Examiner—J. Spencer Overholser
Assistant Examiner—R. L. Spicer, Jr.
Attorneys—H. B. Roberts, James C. Logomasini, Michael J. Murphy and Peter L. Costas ABSTRACT: Apparatus for thermoforming synthetic plastic sheet material into hollow articles includes a platen member providing a rigid surface and a mold member having the desired cavity and a cutting blade edge. The two members are movable relative to each other and one of the members is mounted for pivotal movement relative to the other about the axis of movement of the movable member so as to accommodate misalignment of the two members.

PATENTED MAY 4 1971

INVENTOR.
JOHN D. AL-ROY

BY

*Peter L. Costa*

ATTORNEY

PATENTED MAY 4 1971

INVENTOR
JOHN D. AL-ROY

BY

ATTORNEY 3,577,594

APPARATUS FOR FORMING HOLLOW ARTICLES

BACKGROUND OF THE INVENTION

In recent years there has been ever increasing utilization of thermoformed containers of synthetic plastic material for various packaging applications. Among the most widely utilized container forms are trays which may be overwrapped with a film of synthetic plastic material to provide an attractive and hygienic container affording the opportunity to display the goods either partially or in their entirety if the tray is formed of a transparent material.

As is well known, various techniques are employed for the thermoforming and finishing of the containers from the basic sheet stock. From the standpoint of speed and economy of operation, the thermoforming technique which has achieved very widespread application involves the forming of the container depressions in a long length of the sheet material at one stage, usually several across the width of the sheet material, by means of multicavity dies, and the use of the web between the container cavities to carry the partially formed containers to a subsequent stage where the sheet material is treated to separate the container from the web of material about them. Generally, the forming dies also include cooperating surfaces providing a cutting knife edge and bed to cut substantially through the thickness of the synthetic plastic material by a stroke of the ram operating the dies so that the tray forms may be separated from the web at a subsequent stage simply by flexing the sheet material or otherwise applying a separating pressure.

If there is misalignment between the blade edge and platen against which it operates (i.e., they are not parallel) there is a tendency for the uneven cutting operation to produce jagged edges and whiskers or other particles of the synthetic plastic along the edge or flange of the container. This tendency is particularly pronounced when the material is biaxially oriented to achieve great strength at relatively low cost per pound of material. The jagged edge of the container represents a potential problem in that it may subsequently cut through a film overwrapped about the container and it and the whiskers may be unpleasant to the touch of the customer during use. Moreover, if the cutting edge does not cut through the plastic material sufficiently over a significant portion of the container periphery, subsequent separation of the containers from the web may be difficult and rejects may be produced.

The problem of maintaining proper parallel alignment of the surfaces of the mold and platen members is quite significant in large volume apparatus due to the size of the overall assemblies and due to tolerances in manufacture that must be provided. To some degree, possible misalignment may be increased by any slight deviation in the path of movement of the ram which operates one of the members to move it relative to the other. Misalignment is an even greater problem in multicavity dies since any misalignment at any point in a unitary multicavity die or cooperating unitary platen will produce misalignment over the entire die. If individual die members are mounted on a support, the problems of obtaining alignment are compounded by the number of individual dies. Misalignment during the cutting stroke is also undesirable since it will tend to produce uneven wear of the die and platen.

It is an object of the present invention to provide novel apparatus for thermoforming synthetic plastic sheet material in which misalignment of the cutting blade edge and platen during the cutting stroke is essentially eliminated.

It is also an object to provide such apparatus which is particularly adapted to multicavity mold operation wherein a multiplicity of hollow articles may be formed in a single stroke of the apparatus.

Another object is to provide such apparatus which may be readily adapted to many existing thermoforming machines at relatively low cost which may be fabricated relatively simply.

SUMMARY OF THE INVENTION

It has now been found that the foregoing and related objects can be readily attained in apparatus including an apparatus frame, a platen member providing a relatively rigid surface and a mold member with a mold cavity of the desired configuration in one surface thereof and a cutting blade edge extending about at least a portion of the periphery of the mold cavity. Drive means on the frame supports one of the mold and platen members for movement relative to the other so as to clamp synthetic plastic sheet material placed therebetween. One of the platen and mold members is mounted by mounting means to one of the frame and drive means so as to provide for pivoting thereof about the axis of movement of the movable member.

The mounting means includes a first spherical surface on the mounted member, a cooperating spherical surface on the member upon which it is supported or mounted and an elongated fastener seated in and securing the mounted and support members together with the spherical surfaces being slidable over each other since one of the surfaces is generally convex and the other is generally concave. The fastener is movably seated in one of the mounted and support members to permit pivoting of the mounted member relative to the support member about the axis of movement of the movable member. In this manner, the mold member and platen member may align themselves with their opposed surfaces in substantially parallel relationship upon relative movement thereof into clamping relationship with sheet material received therebetween. Second mounting means mounts the nonpivotably mounted member on the other of the frame and drive means.

In accordance with the preferred aspect of the present invention, the mounting means is provided by two pairs of cooperating spherical surfaces at spaced points along the length of the elongated fastener which secures the mounted and support members together. Greater controlled rocking action is thereby provided through the axis of movement of the movable member since the fastener is movably seated in one of the pair of cooperating spherical surfaces. Generally, the blade edge will extend substantially entirely about the mold cavity and will be spaced therefrom so as to provide a flange on the hollow article which is formed thereby. Desirably, the movable member is also the one which is mounted for pivotal or rocking action. Since the present invention readily adapts itself to the mounting of a multiplicity of mold units on a suitable support element to provide a multicavity mold, the mold units are most effectively those which are mounted for pivotal or rocking movement.

DETAILED DESCRIPTION OF THE ILLUSTRATED EMBODIMENT

Figure 1:
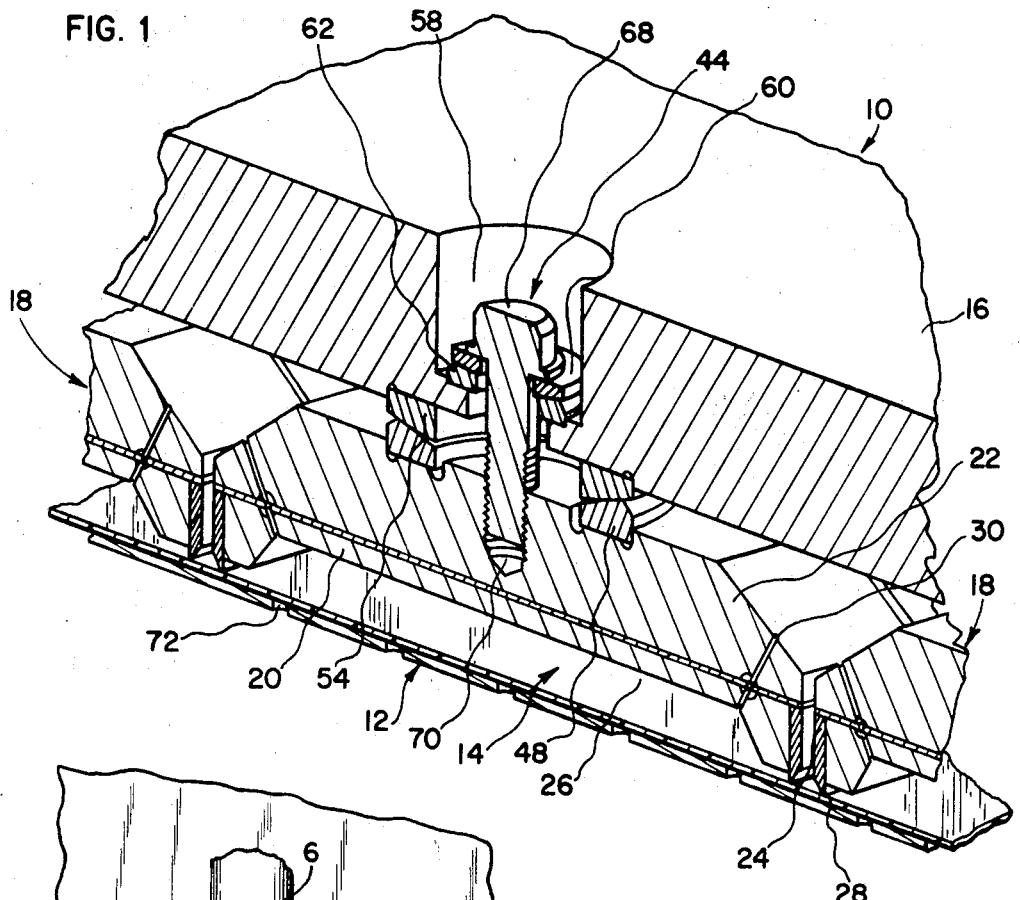
FIG. 1 is a fragmentary perspective view in section of a mold and platen assembly of thermoforming apparatus embodying the present invention with a length of synthetic plastic sheet material received therebetween.

Turning now in detail to the attached drawings, a mold and platen assembly embodying the present invention is illustrated therein and includes the fragmentarily illustrated apparatus frame generally designated by the numeral 8, the female mold member generally designated by the numeral 10 and the platen member generally designated by the numeral 12. The mold member 10 and platen 12 are mounted in suitable apparatus (not shown) within the frame 8 providing relative movement therebetween so that plastic sheet material generally designated by the numeral 14 may be moved therebetween in the open position thereof and clamped therebetween in the closed position thereof. Generally, the mold number 10 will be carried by a ram or other movable element 6 for movement against and away from the fixed platen 12.

As best seen in FIG. 1, the female mold member 10 has a platelike support element 16 which is secured in the apparatus and has secured thereon a multiplicity of molds generally designated by the numeral 18 and each comprised of the mold element 20, the cutting knife unit 24 and the base element 22. The mold element 20 has a mold cavity 26 in its outer surface and the hardened cutting knife unit 24 provides a blade edge 28 extending somewhat beyond the outer face of the mold element 20. Air passages 30 extend through the mold element 20, base element 22 and cutting knife unit 24 from the periphery of the inner wall surface of the mold cavity 26 and open at the face of the base element 22 adjacent the support element 16. Thus, the configuration of the mold cavity 26 and cutting knife unit 24 will provide a molded sheet structure generally of the type illustrated in FIG. 4 and generally designated by the numeral 34. As seen, the molded structure 34 has a multiplicity of container forms each having a base wall 36, sidewall 38 and flange 40 defined by the partial cut 42 produced by the cutting knife unit 24.

Figure 2:
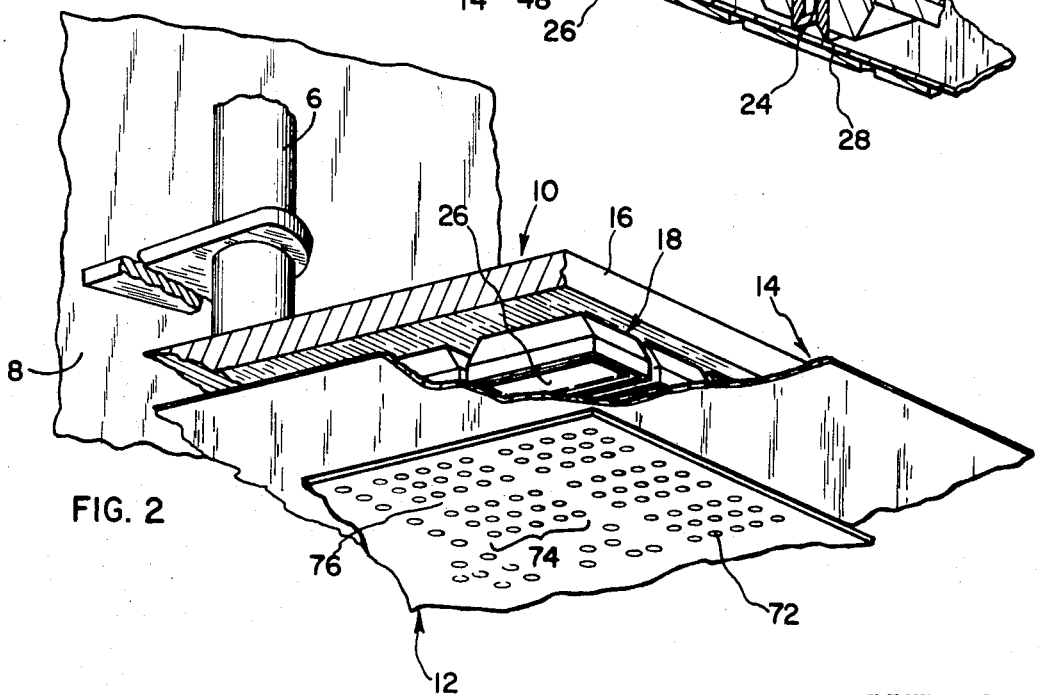
FIG. 2 is a perspective view of the assembly of FIG. 1 from the platen side to a reduced scale and with the parts separated and the sheet material broken away for purposes of illustration.
Figure 3:
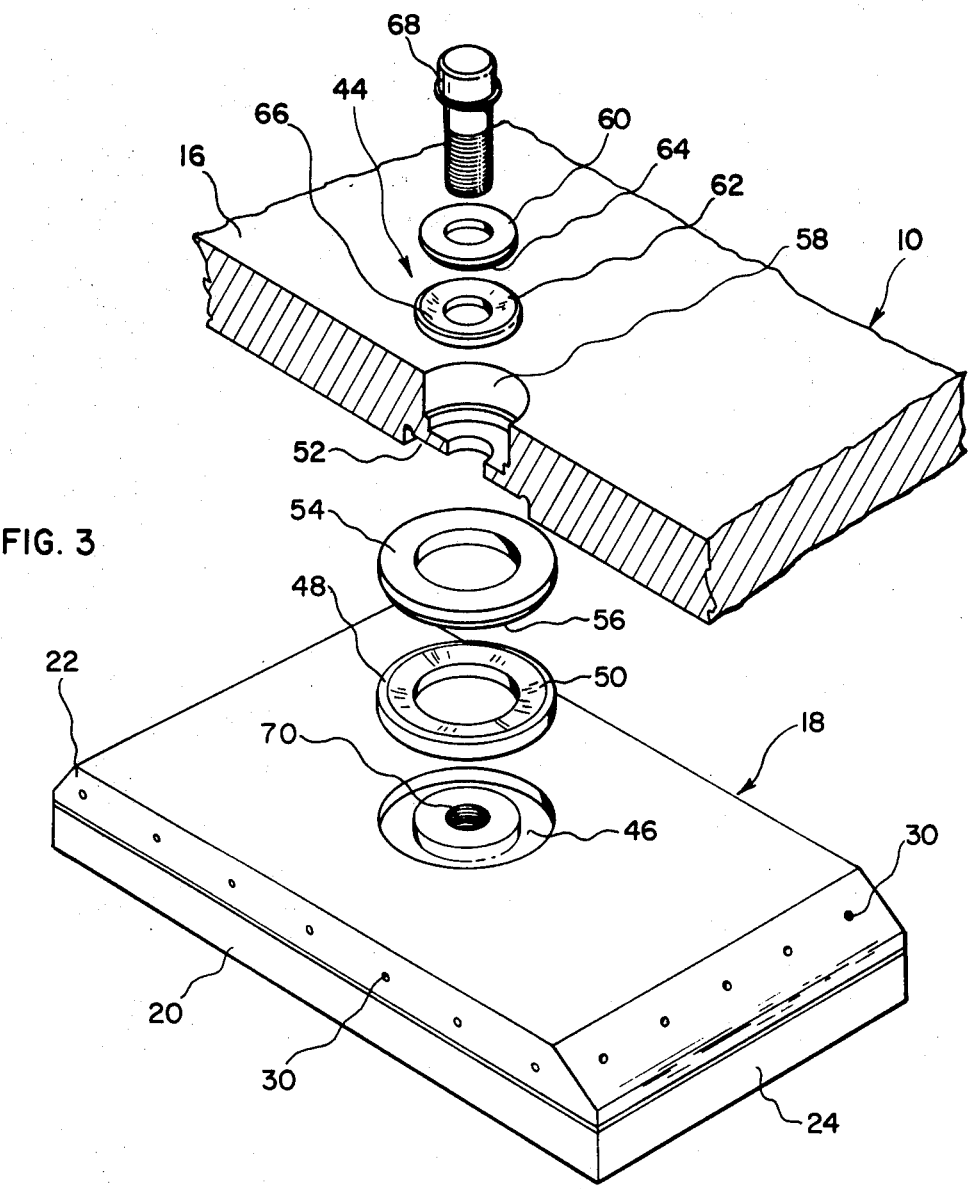
FIG. 3 is an exploded view of the mold member assembly of FIG. 1.

The molds 18 are mounted on the support element 16 so as to be capable of limited universal adjustment by the spherical mounting assembly generally designated by the numeral 44. The base element 22 of each mold 18 has in its face adjacent the support element 16 an annular recess 46 in which is seated an annular thrust bearing 48 with a concave spherical surface 50. The adjacent face of the support element 16 has a cooperating circular recess 52 in which is seated a bearing element 54 with a convex spherical surface 56 having a radius cooperating with that of the surface 50 so as to be slidable therein. In its face spaced from the mold 18, the support element 16 has an circular recess 58 in which is seated a pair of washers 60, 62 having opposed cooperating spherical surfaces 64,66. The threaded fastener 68 extends through the washers 60 and 62, the support element 16, the bearing 48 and bearing element 54; and the threaded portion thereof is threadably engaged in the threaded aperture 70 of the base element 22. As can be seen in FIGS. 1 and 2, the molds 18 are spaced apart on the support element 16 so as to permit pivoting thereof freely and independently of adjacent molds 18.

Figure 4:
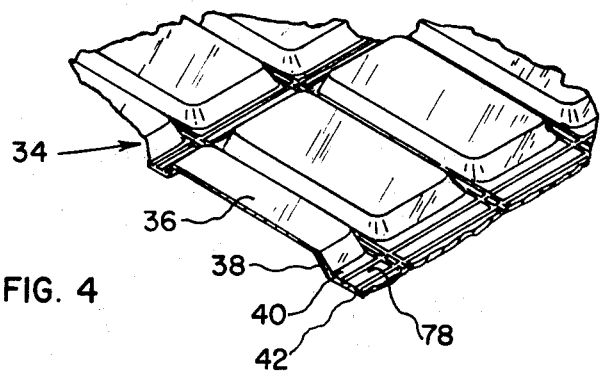
FIG. 4 is a fragmentary perspective view of synthetic plastic sheet material after forming and partial cutting in the apparatus of FIGS. 1—3.

The platen 12 is a hardened metallic platelike element secured in the apparatus by suitable means (not shown). Extending therethrough is a multiplicity of apertures 72 arranged in clusters 74 corresponding generally to the mold cavities 26 of the mold elements 20, and the unapertured surface portions 76 correspond to the spacing between molds 18 or the web portion 78 of the formed sheet material 34 as seen in FIG. 4. The apparatus provides a plenum chamber (not shown) on the surface of the platen 12 opposite from that in contact with the sheet material 14 to permit drawing a vacuum, or applying positive air pressure, through the apertures 72. Similarly, the apparatus provides a plenum chamber (not shown) about the molds 18 to permit drawing a vacuum, or applying positive air pressure, through the air passages 30.

In operation of the illustrated embodiment, a length of plastic sheet material 14 is first moved into the space between the mold member 10 and platen 12 after they have been opened at the completion of a forming cycle. Generally, the movement is effected by automatic indexing means 6 operated synchronously with the operating ram (not shown) which moves the mold member 10 relative to the platen 12. The operating ram (not shown) then moves the mold member 10 downwardly towards the upper surface of the sheet material 14 which is being supported on the upper surface of the platen 12 and the cutting knife unit 24 contacts the sheet material 14. If there is any misalignment of the cutting blade edge 28 of the cutting knife unit 24 of a mold 18 and the surface of the platen 12 cooperating therewith, the individual molds 18 will rock about the spherical mounting assembly 44 until the two opposed surfaces are substantially parallel.

More particularly, if the surface of the blade edge 28 of the mold 18 is not in substantially parallel alignment with the cooperating surface portion of the platen 12, only part of it will initially contact the upper surface of the sheet material 14 which will provide some resistance to its movement. This resistance in turn produces pivoting of the entire mold 18 about the spherical mounting assembly 44 until the blade edge 28 is substantially parallel and uniform resistance to movement of the blade edge is provided about the entire periphery of the mold 18. In the pivotal action, it can be seen that the convex spherical surfaces 56 and 64 of the bearing element 54 and washer 60 will slide over the cooperating concave spherical surfaces 50 and 66 of the thrust bearing 48 and washer 62 as the elongated fastener 68 pivots about the axis or path of movement of the mold 10 provided by the operating ram 6.

As the stroke of the ram continues, the blade edge 28 firmly clamps the sheet material 14 against the platen 12 and provides an air tight seal about the periphery of the mold cavity 26 by reason of its limited penetration thereinto. In normal practice, the platen 12 is heated and air is being drawn through the platen apertures 72 to hold the sheet material 14 firmly thereagainst while at the same time air is being blown through the air passages 30 of the molds 18 to facilitate seating the sheet material 14 against the platen 12 as the aligning operation is taking place.

After the aligning and clamping operations have taken place, the air flow is continued and the sheet material 14 is brought to the desired forming temperature by the heated surface of the platen 12. At this point, the direction of air flow through the assembly is reversed with air under relatively high pressure being direction upwardly through the apertures 72 of the platen 12; and it will be noted that the clusters 74 are disposed inwardly of the clamped periphery of the sheet material 14 as defined by the cutting knife units 24 of the several molds 18 and that the space 76 therebetween is unapertured. Simultaneously, air is exhausted from the mold cavity 26 through the air passages 30, preferably by negative pressure. In this manner, the air pressure forces the sheet material 14 tightly against the surface of the mold cavities 26 of the several molds 18.

After the sheet material 14 is formed, the ram 6 is actuated to drive the mold member 10 towards the platen 12 a slight additional distance and the cutting blade edges 28 of the molds 18 now are driven almost through the thickness of the sheet material 14, but sufficient thickness remains to maintain the thermoformed containers within the web 78 for transport to the next station of the forming apparatus. The ram 6 is then actuated to open the mold 10 and platen 12, and the direction of air flow is reversed with air pressure introduced through the air passages 30 serving to eject the individual container forms from the mold cavities 26 in which they are disposed. The molded sheet structure 34 illustrated in FIG. 4 is thus produced and disposed on the surface of the platen 12. The formed length of molded sheet structure 34 is then withdrawn from the forming station, preferably by automatic indexing apparatus, and the individual containers may be separated from the web 78 merely by flexing the sheet material 14.

It will be readily appreciated that there are many variations possible in the illustrated embodiment of the apparatus to achieve the benefits of the present invention.

Although it is possible to mount the platen for pivotal movement relative to the mold member when only a limited number of mold cavities are involved, it will be appreciated that the optimum benefit of the present invention is obtained by permitting individual adjusting action with respect to each mold cavity of the assembly. This can be obtained by forming the platen from a multiplicity of platen elements each pivotally mounted in accordance with the present invention; however, this detracts from the ability to use the platen effectively as the means for heating the sheet material uniformly because of the space necessary between the platen elements to permit the desired rocking action. Generally, the use of the pivotal mounting for the mold elements allows the greatest versatility in the forming apparatus since the mold elements can be readily interchanged, adjusted and repaired.

Although one member may be movably mounted and the other pivotably mounted, the preferred apparatus provides the pivotal mounting for the movable member since this appears to best utilize the rocking action. Moreover, it enables greater rigidity to be provided in the cooperating member so that the desired parallel relationship and good cutting and clamping action can be obtained. Nevertheless, it is possible to provide for pivotal and movable mounting of both the mold and platen members but the little added benefit possible does not appear to warrant the complications in structure and operation. Similarly, both the platen and mold members may be mounted for movement relative to each other.

Although it is possible to achieve rocking action with a single pair of cooperating spherical surfaces in the spherical mounting assembly, the preferred arrangement is to provide two pairs of such surfaces spaced along the length of an elongated fastener securing the mold to its support element. This permits more controlled pivoting and simultaneously affords greater sensitivity to misalignment. It will be appreciated that the spherical surfaces may be integrally formed in the mold and support element, and that the fastener may also be formed with a spherical surface such as on the underside of the head thereof. However, ease of fabrication, optimum use of materials for low friction and ease of replacement greatly dictate the use of precision elements separately formed and assembled to the mold and support elements such as the bearings and washers in the illustrated embodiment.

The remaining structure and operation of the thermoforming apparatus may vary considerably from that illustrated and described. Instead of a double-stroke for the operating ram so as to initially clamp the sheet material and thereafter substantially cut through the sheet material, a single-stroke ram may also be employed, if so desired. Similarly, instead of using positive air pressure to provide the primary forming pressure for the sheet material, a strong vacuum drawn through the mold elements may be employed, if so desired. Obviously, the sheet material may be preheated before passage into the forming station, if so desired, and other means may be utilized for heating the sheet material rather than reliance upon heat transferred thereto from the heated platen.

Although the mold defining the form of the hollow article to be produced may have a wide variety of configurations, the present invention is most beneficially employed with molds designed to produce hollow articles having a laterally extending flange. In such structures, the cutting knife assembly and its cutting blade edge will be spaced outwardly from the periphery of the mold cavity to the desired extent necessary to define the peripheral flange. Generally, this flange will extend entirely or substantially about the periphery of the hollow article although by proper design of the cutting knife assembly, corners or other portions of the flange may be entirely eliminated or substantially reduced.

The apparatus of the present invention is applicable to the thermoforming of containers and hollow articles from various synthetic thermoplastic materials. Exemplary of suitable thermoplastics are the polyolefins such as polyethylene, ethylene-propylene copolymers and isotatic polypropylene, polyacrylates, polymethacrylates, polycarbonates, polyvinyl chloride, polyethylene terephthalates and styrene polymers. The preferred thermoplastics are styrene polymers such as biaxially oriented polystyrene, impact polystyrene, ABS and styrene/acrylonitrile copolymers. Generally, the apparatus is most beneficial when employed with biaxially oriented materials since these tend to be more sensitive to unequal cutting and crushing action.

Thus, it can be seen that the present invention provides a novel apparatus for thermoforming synthetic thermoplastic sheet material which enables substantial elimination of any misalignment between the opposed faces of the cutting blade edge and cooperating platen during the cutting stroke. The novel assembly of the present invention is particularly adapted for use with multicavity apparatus so that a multiplicity of hollow articles may be formed in a single stroke or cycle of the apparatus. As can readily be seen from the foregoing detailed description, the apparatus and assembly of the present invention may be readily adapted to various types of existing thermoforming machines at relatively low cost and the necessary assemblies may be fabricated relatively simply and economically.

I claim:
1. In apparatus for thermoforming hollow articles from synthetic thermoplastic material, the combination comprising:
   a. an apparatus frame;
   b. a platen member providing a relatively rigid surface;
   c. a mold member having a mold cavity of the desired configuration in one surface thereof and a cutting blade edge extending about at least a portion of the periphery of said mold cavity;
   d. drive means on said frame supporting one of said members for movement relative to the other so as to clamp sheet material therebetween;
   e. means mounting one of said members on one of said frame and drive means and providing for pivoting thereof about the axis of movement of the movable member, said mounting means including a first spherical surface on the mounted member, a cooperating spherical surface on the support member upon which mounted and an elongated fastener seated in and securing the mounted and support members together, one of said spherical surfaces being generally concave and the other being generally convex with said spherical surfaces being slideable over each other, said fastener being movably seated in one of said mounted and support members to permit pivoting of the mounted member relative to the support member about the axis of movement of the movable member so that the mold member and platen member may align themselves with their opposed surfaces in substantially parallel relationship upon relative movement thereof into clamping relationship;
   f. and second mounting means mounting the nonpivotably mounted member on the other of said frame and drive means.

2. The apparatus in accordance with claim 1 wherein said first mentioned mounting means includes a second pair of cooperating spherical surfaces, said fastener extending through said first mentioned pair of spherical surfaces and said second mentioned pair of spherical surfaces and being movably seated in said second mentioned pair of spherical surfaces.

3. The apparatus in accordance with claim 1 wherein the member supported on said drive means is said mold member.

4. The apparatus in accordance with claim 1 wherein said cutting blade edge extends substantially entirely about the periphery of said mold cavity.

5. The apparatus in accordance with claim 1 wherein there is included a support member carried by one of said frame and drive means, wherein a plurality of mold members is included and wherein a plurality of mounting means in included and individually mount each of said mold members on said support member so as to permit pivoting thereof.

6. The apparatus in accordance with claim 5 wherein said platen member has a multiplicity of apertures therein aligned with the mold cavities of said mold members so as to permit the application of air pressure on sheet material received between said platen and mold members.

7. The apparatus in accordance with claim 5 wherein each of said mounting means includes a second pair of cooperating spherical surfaces, said fasteners extending through said first mentioned pair of spherical surfaces and said second mentioned pair of spherical surfaces and being movably seated in said second mentioned pair of spherical surfaces; and wherein said movably mounted member is said mold member.

8. The apparatus in accordance with claim 7 wherein said cutting blade edge of each of said plurality of mold members extends substantially entirely about the periphery of the mold cavity thereof.